United States Patent [19]

Seraj

[11] Patent Number: 5,388,095
[45] Date of Patent: Feb. 7, 1995

[54] REPRESENTING SUBSCRIBERS IN A MULTIPLE INTERFACE ENVIRONMENT SWITCHING SYSTEM

[75] Inventor: Jila Seraj, Plano, Tex.

[73] Assignee: Telefonaktiebolaget L M Ericsson, Stockholm, Sweden

[21] Appl. No.: 103,889

[22] Filed: Aug. 6, 1993

[51] Int. Cl.⁶ .............................................. H04J 3/12
[52] U.S. Cl. ............................... 370/58.1; 370/110.1; 379/156
[58] Field of Search .................... 370/58.1, 58.2, 58.3, 370/62, 110.1; 379/93.94, 95, 156, 165, 201, 245, 246, 258, 268, 352, 353

[56] References Cited

U.S. PATENT DOCUMENTS

| | | | |
|---|---|---|---|
| 5,008,884 | 4/1991 | Yazawa et al. | 379/93 X |
| 5,062,103 | 10/1991 | Davidson et al. | 370/110.1 X |
| 5,204,861 | 4/1993 | Wiebe | 379/156 X |

*Primary Examiner*—Melvin Marcelo
*Attorney, Agent, or Firm*—Johnson & Wortley

[57] ABSTRACT

Individual subscriber appearances having a common directory number are identified with the existing software modules of a stored program controlled telecommunication switching system by redefining the format of the subscriber pointer data word used therein. An addition field comprising a call appearance member number is added to the subscriber pointer data to produce a subscriber call identifier data word.

28 Claims, 3 Drawing Sheets

REPRESENTING SUBSCRIBERS IN A MULTIPLE INTERFACE ENVIRONMENT SWITCHING SYSTEM

BACKGROUND OF THE INVENTION

1. Field of the Invention

The present invention relates to addressing arrangements within telecommunication switching systems, and more particularly, to the representation of subscribers with multiple appearances of the same directory number within call processing software of telecommunication switching systems.

2. Description of the Related Art

In complex data processing systems, such as telecommunication switches, multiple software units are employed and information is transferred between the units by means of software signals. Each of these signals comprise one or more data words and each software unit is processed by one or more associated processors. Each processor is, in turn, formed in part by a number of different registers which store the data words sent to a software unit in the associated processor. Thus, the maximum number of data words that can be transferred in a software signal is, at least in part, a function of the number of available registers in the processor.

Actions taken within each software unit or module depend upon the data carried by the signal or signals that activate the processing in the particular software module. When a new functionality is added to a complex switching system, the content and the meaning of some of the data words must be changed. It may also be necessary to add new data words in the existing signals. Such a need generates implementation problems in that various specific items of data may "float" (that is, be "used") throughout the complex system in many different software modules. Thus, any change in data word format, such as the addition of additional fields of data, may require the updating of a large portion of the software in each of the different modules resulting in considerable expenditure of time and money. It is also possible for the software signals to become "full", i.e., wholly lacking any space for the addition of new data words or data fields within those signals. In such cases it may be necessary to add entirely new signals in order to carry the additional fields of information similarly requiring modification of the software at substantial expense.

The types of problems that can arise in adding functionality to a data processing system can be seen in telecommunication switching environment. For example, in conventional switching systems which provide plain old telephone service (POTS), there has historically been a one-to-one relationship between the directory number assigned to the subscriber and the telephone instrument or device that subscriber number is assigned to. In such systems, a single data word is used as an identity throughout the software modules of such a system to identify which subscriber interface, and thus which subscriber number, a certain activity or function is related to.

Referring to FIG. 1, for example, there is shown a block diagram depicting a data structure for a subscriber interface and subscriber number in a conventional telecommunications switching system. In FIG. 1, it can be seen that a set of subscriber data files 2 is used to store information regarding a subscriber's properties and features. A single pointer 4 to these files is used to access subscriber data from throughout the overall telecommunication switching system. This pointer 4, a subscriber data file pointer, plays a central role in traffic handling and in the administration of subscriber data.

When a subscriber goes off-hook, the subscriber data file pointer 4 is fetched from the line interface files to establish a line access. This pointer 4 is then used during the call to identify the call and to fetch data from the subscriber data files 2 as needed. Data which may be fetched included subscriber features, signalling schemes to be used, charging information and other vital information for call handling and administration.

When a call is terminated to a subscriber in conventional telecommunication switching systems, the analysis of the digits leads to the subscriber data file pointer 4. With this pointer 4, a line interface file pointer 6 may be accessed and activated. Both pointers cooperate to identify the subscriber access.

The above-described conventional system functioned adequately as long as a one-to-one relationship exists between the subscriber line interface and the subscriber number. When such a relationship does no longer exist, the system does not work. For example, in the integrated services digital network (ISDN) line identity is no longer sufficient alone to identify the calling or called party since a single directory number may be associated with multiple terminals or subscribers. To identify these subscribers, ISDN uses the concept of sub-addressing within ISDN messages sent through the telecommunications switch, as referred to U.S. Pat. No. 5,008,884 to Yazawa et al., which renders the subscriber data file pointer and/or a line interface pointer no longer sufficient to identify a particular terminal within the call handling software of the switch itself. More particularly, an ISDN basic access line may have up to eight (8) terminals connected, each with a different set of service categories and features. An electronic key telephone system (EKTS) terminal, a subset of ISDN telephone service, may have up to one hundred twenty eight (128) subscribers connected to it. In other words, for the same line interface record, many records in the subscriber data file are necessary in order to adequately define and specify subscriber information. On the other hand, in a multiple directory number group, the same subscriber number may be shared by up to five hundred twelve (512) line interfaces. This results in one subscriber data file record for many line interface records. Clearly, prior art mechanisms and subscriber identifications are inadequate in modern telephone switching systems.

The technique of using both a subscriber identification and sub-address field as provided in ISDN, functions adequately where means are provided external to the switch for decoding the ISDN message containing the sub-address. Such decoding is performed within the individual ISDN terminals as part of their communication with other terminals via the ISDN protocol. Such sub-addressing within the ISDN protocol is not recognized by the switching system itself as terminal identity, but only carried through the switch as a data message between line access connections. As pointed out above, today the vast majority of telecommunication switches providing POTS service rely upon a subscriber pointer SCp to identify the subscriber within the software signals communicated between different call processing software modules. The addition of a separate data field for sub-addressing different terminals having the same directory number would require essentially rewriting all of the software modules to accommodate a new field of data within their system of signals. Such rewriting of software is inordinately expensive and requires the modification of numerous modules which have no need whatsoever to distinguish between separate individual terminals assigned to the same directory number.

SUMMARY OF THE INVENTION

The present invention addresses the deficiencies of the prior art by using existing data words to carry information that must be newly added to a complex software system. The present invention further structures the existing data words in such a way that they can accept and include additional new information in a manner which is transparent to certain modules, but recognized by others. Therefore, only the software modules which actually need to acknowledge the new data must be modified to accommodate it.

In one aspect, the present invention includes identifying individual subscriber appearances having a common directory number within the software modules of a telecommunication switching system by defining a subscriber call identifier data word to include a first data field comprising a subscriber pointer corresponding to the directory number with which the subscriber is associated and a second data field comprising a call appearance member number corresponding to the individual subscriber appearance with which the call is associated. The subscriber call identifier data word is passed through the software modules of the switching system and the call appearance member number data field of said subscriber call identifier data word is only recognized within the software modules which implement functionality associated with an individual subscriber appearance.

In a further aspect of identifying individual subscriber appearances having a common directory number within the software modules of a telecommunication switching system in accordance with the invention, the defined subscriber call identifier data word contains the same number of bit positions as was employed for the subscriber pointer data within the software modules.

In a still further aspect of identifying individual subscriber appearances having a common directory number within the software modules of a telecommunication switching system in accordance with the invention an access subsystem is included within the switching system. A plurality of distinct terminals are located within the access subsystem and each is associated with one or more directory numbers and a call access from a subscriber includes a message containing a distinct call appearance ID number. A set of data files are defined within the switching system in which a terminal pointer is associated with each of the terminals and for each terminal pointer there is established a relationship between call appearance ID numbers, corres pondi ng di rectory numbers and corresponding call appearance member numbers. In addition a set of data files may also be defined within the switching system in which a subscriber pointer is associated with each of the directory numbers and for each subscriber pointer there is established a relationship between call appearance ID numbers, corresponding terminal pointers and corresponding call appearance member numbers.

In yet another aspect, the present invention calls are processed within a stored program controlled telecommunications switching system used for integrated services digital network service in which a plurality of individual subscriber appearances connected to the switching system by means of access terminals have a common directory number and within which the call processing software modules include a data base identifying each directory number by a subscriber pointer contained within a fixed multibit data word. A request for access is recognized within the switching system in response to an off-hook signal received at a terminal associated with one or more directory numbers and a setup message is received from the terminal requesting access. The message includes a call appearance ID and the particular access terminal upon which the off-hook signal was received is identified within the switch. Information is located within a terminal file data base corresponding to the particular access terminal and, in response to the call appearance ID received within the setup message, a corresponding directory number and call appearance member number associated with the particular subscriber appearance originating the access request from the access terminal is identified. A subscriber call identifier data word is assembled within the bit format of the fixed multi bit data word comprising the call appearance member number and the subscriber pointer. The subscriber call identifier data word is used in processing the call from the access terminal within the software modules of the switching system.

BRIEF DESCRIPTION OF THE DRAWINGS

For a more complete understanding of the present invention and for further objects and advantages thereof, reference may now be had to the following description taken in conjunction with the accompanying drawings, in which.

DETAIL DESCRIPTION OF THE INVENTION

In the early versions of the stored program control telecommunication switching systems, the processors employed were 16 bit devices. However, later on, systems were introduced and are commonly employed today using 32 bit or higher capacity processors. In addition, the subscriber identifying word commonly used by the call processing software within the vast majority of POTS telecommunication switches, the subscriber pointer, employs a data word anticipated to have a maximum of 20 bits. 20 bit positions allows the internal specification of more than a million subscribers, far more than the capacity of any current signal switching system using present technologies. Nevertheless, this is the data format within which current switching systems employ the incorporation of subscriber pointers to identify individual subscribers within the switch. The addition of any subsequent sub-addressing in the form of a sub-address word or add-on to this 32 bit data field would require a rewrite of the software in order to accommodate the additional field into the data handling structure.

Figure 1:
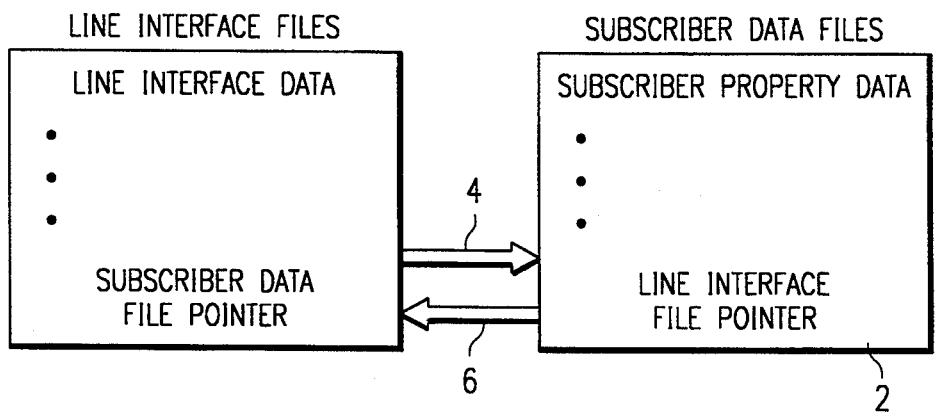
FIG. 1 is a schematic diagram of a prior art data structure for a subscriber interface and subscriber number file arrangement.
Figure 2:
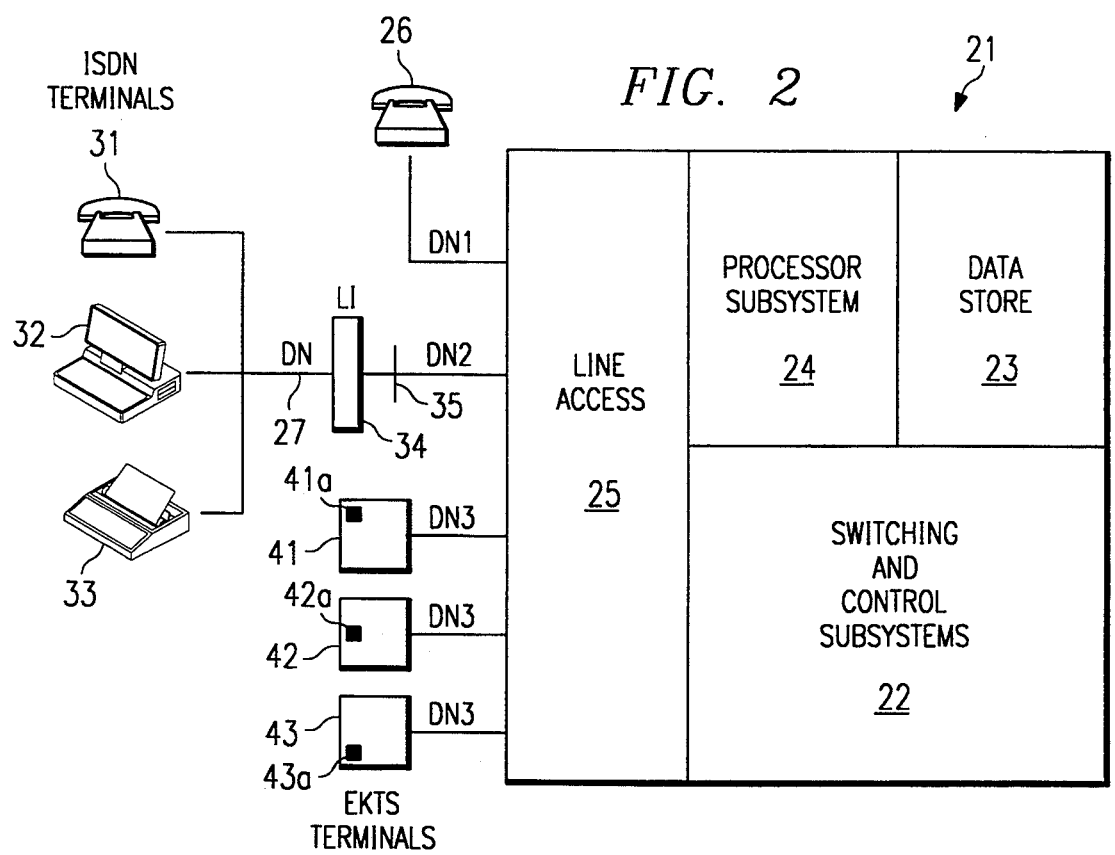
FIG. 2 is a block diagram illustrating a telecommunications switching system within which the present invention may be implemented.

Referring to FIG. 2, there is shown a block diagram of an exemplary telecommunications switching system 21 such as the AXE exchange, an early version of which is disclosed in the article by Mats Eklund et al., entitled "AXE10 System Description" published in *Ericsson Review*, No. 2, 1976 which is hereby incorporated by reference herein, containing a switching and control section 22, a data store memory area 23 and a processor subsection 24. In addition, the switching system 21 includes a line access portion 25 into which a plurality of terminals are connected. For example, a conventional telephone instrument 26 is connected to line access 25 and is assigned to a terminal having a directory number DN1. Such a telephone instrument 26 may be provided with ordinary POTS telephone service in which a single instrument 26 is connected to a single line termination at the line access 25 and is identified thereon by a single directory number DN1. Similarly, the switching system 21 may also be supplying ISDN telecommunication service in which a single line 27 is coupled from a plurality of different terminals such as a telephone instrument 31, a PC 32 or a fax machine 33, each of which shares the common line 27 having the common directory number DN2. The terminal to which line 27 is assigned is connected to the line by means of a line interface 34 and communicated therewith by means of an ISDN access protocol 35. Calls received on the single directory number DN2 intended for one of the terminals 31-33 on line 27 are identified within the ISDN protocol messages by the sub-addresses decoded by and responded to by the individual terminal devices 31-33. The actual completion of the call through the switching system 21 by means of the software therein processes the call as being a single line access identified by the directory number DN2 and identified by a single conventional subscriber pointer within the software.

Continuing to refer to FIG. 2, there is also shown a plurality of EKTS terminals 41, 42 and 43, which are also connected to the line access 25 by means of a line interface (not shown) and in which each contain a separate key 41a, 42a, and 43a which are identified by a single directory number DN3. In accordance with the specification defining ISDN and EKTS telecommunication service, including "ISDN and Features—Common Switching and Signal Generic Requirements" and "ISDN Electronic Key Telephone Service" as defined in Bellcore Technical References TR-TSY-000847, and TR-TSY-000205, respectively, each of which are incorporated by reference herein, each of the EKTS terminals 41-43 contain specific keys 41a, 42a, and 43a which are identified by call appearance IDs. Each key 41a-43a would be associated with a separate call appearance member number of the same directory number.

In an EKTS system, a shared directory number (SDN) can have a plurality of call appearances (CA1--CA16). Each call appearance can have up to 32 call appearance numbers (CAM#1-CAM#32). This results in a maximum of up to 512 call appearance member numbers per shared directory number. Directory number (D ) plus call appearance member number identifies the call appearance pointer (CAp). CAp is used by the switch to determine which appearances are busy/idle and which features are being used for the duration of a call. When terminating a call to an EKTS DN, the switching software is unable to distinguish between the respective plurality of call appearance members assigned to the single directory number DN3 and thus, cannot provide different treatment to those appearances in accordance with individual subscriber features. The system of the present invention enables specific features to be implemented after call setup to individual ones of the call appearance members while, at the same time, obviating a rewrite of the majority of the software blocks within the conventional telecommunication system and allowing the subscriber call identifier data word to remain essentially transparent to the remainder of the processing software.

Figure 3:
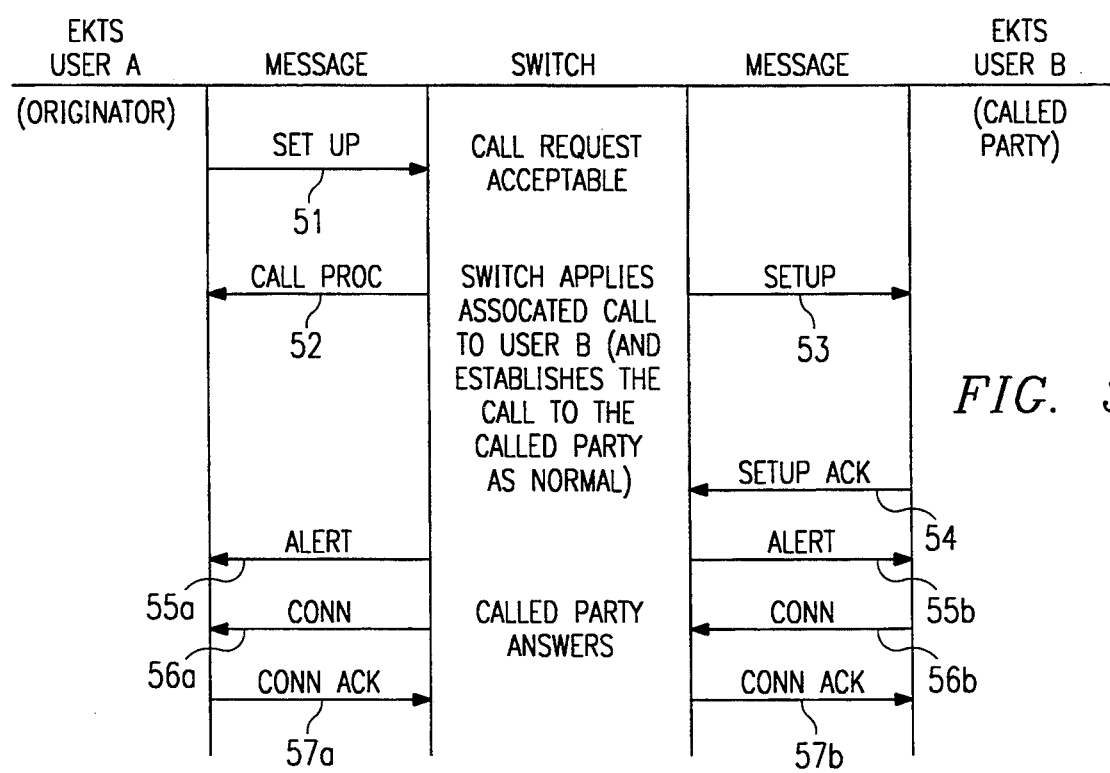
FIG. 3 depicts exemplary call origination message sequence used in EKTS telephone service.

Referring next to FIG. 3, an illustrative successful call origination message sequence for an EKTS call setup is illustrated. In the procedure, a call SETUP message 51 to the switch, which in accordance with ISDN message protocol identifies the bearer capabilities, the sub-address of the terminal, where appropriate, and a call appearance ID. Thereafter, a CALL PROC message is sent by the switch to the originating User A at 52 and a SETUP message sent to the called User B at 53. A SETUP ACK message from User B 54 back to the switch produces a sequence of alert messages 55a-b to both User A and User B, a connection message when the called party answers 56a-b, and a connection acknowledge 57a-b.

In the current POTS system, when a call access appears by virtue of a line going off-hook, it is recognized by the access as corresponding to a particular terminal. That terminal is assigned to a particular directory number and, as such, is identified by a particular subscriber pointer within the conventional software structure of a telecommunication switching system.

Figure 4:
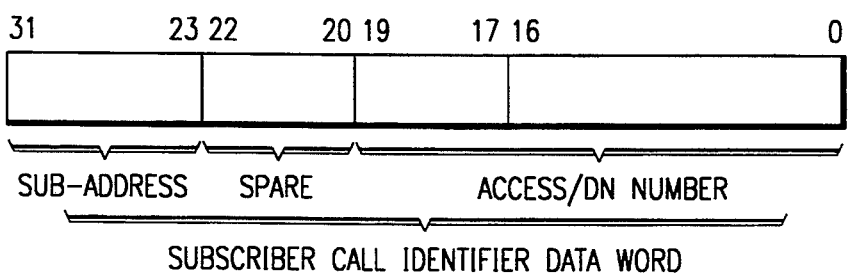
FIG. 4 is a diagram of the subscriber call identifier data word employed in the present invention.

Referring to FIG. 4, there is shown a new data structure in which the 32 bit field within which the subscriber pointer is employed as 20 bits, is redefined in accordance with the present invention to include an additional data word. The 32 bit field is employed as a subscriber call identifier data word in which the bits 0-19 are used to represent the directory number or subscriber pointer SCp while bits 23-31 are used to identify the precise location of the individual subscriber to which that directory number is assigned. In the case of the embodiment shown herein incorporating EKTS, the bits 23-31 are used to define a call appearance member number (CAM#) defining the particular subscriber of a particular call. Moreover, both the subscriber data file pointer (SCp) and the subscriber device pointer (CAM#) are used in the present system to uniquely identify a particular individual for traffic, administration, charging or maintenance purposes. An individual in this context is any phone-set or a directory number key on an EKTS terminal, or a terminal on an ISDN subscriber access) connected to the switch access which is capable of initiating or terminating a call. Moreover, the 32 bit data word is restructured as follows:

| BITS | Function |
| --- | --- |
| 0-19 | To be used for representation of the directory number or subscriber pointer. 20 bits gives the capability of addressing 1,048,576 directory numbers. This number is |

-continued

| BITS | Function |
|---|---|
| | far above capacity of any switching system that exists under current technology. |
| 20-22 | Spare for future use. |
| 23-31 | To be used to identify the exact location of the individual or the sub-address. These 9 bits give the capability of addressing up to 512 sub-addresses. 512 is the maximum number of multiple directory numbers within an EKTS system. |

The 32 bit data word is now employed as a subscriber call identifier data word, comprising both the subscriber pointer and the call appearance member number as defined above. The subscriber call identifier data word will pass through all of the software modules within the switching system and the last bits, comprising the call appearance member number, will only be recognized by the blocks of the software which are selectively reprogrammed to recognize it. For example, in the case of subscriber database blocks, there will be certain information stored, including the subscriber pointer, the terminal/line, the call appearance ID, the call appearance member number, and features associated with that particular subscriber's telecommunication service. Such a block would, of course, recognize the call appearance member number in order to associate particular features with that particular caller. The structure of the data within the present invention provides maximum flexibility and functional capability within the conventional switch, but with a minimum disturbance for the software units therein.

The call appearance member number identifies which terminal that particular call is associated with on the directory number. This enables the system to coordinate not only features, but also special handling or other aspects of the call associated with that particular subscriber service. The principles of the present invention are applicable in the case of any occurrence of multiple appearances of a single directory number.

In the implementation of the present system, the operator of the switching system assigns a particular terminal/access number to a particular call appearance ID and a particular directory number and an arbitrary call appearance number (between 1 and 16). The directory number corresponds to a particular SCp and the switch assigns a particular call appearance member number and a call appearance pointer.

Figure 5:
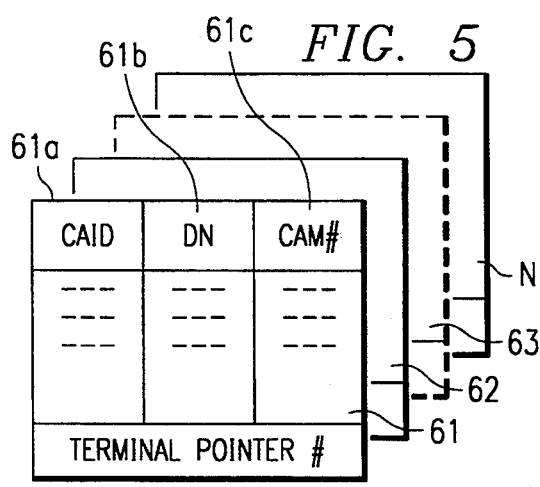
FIG. 5 is a diagram of the terminal file arrangement used in the present invention.

Referring next to FIG. 5, there is shown a diagram of the terminal files within the present system in which for each terminal pointer 61, 62, 63, . . . n, there is contained a file with call appearance ID designation 61a with which there is associated a directory number 61b and a call appearance member number 61c. Thus, from an indication of the terminal number and the call appearance ID obtained respectively from the terminal which is connected to the access of the switch and the setup message from the subscriber, the switch then determines the corresponding directory number and the call appearance member number (CAM#) assigned to that call appearance ID.

Figure 6B:
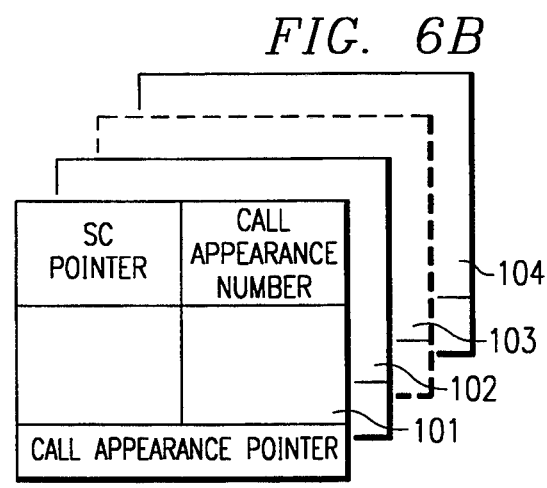
FIG. 6B is a diagram of a second subscriber file arrangement used in the present invention.
Figure 6A:
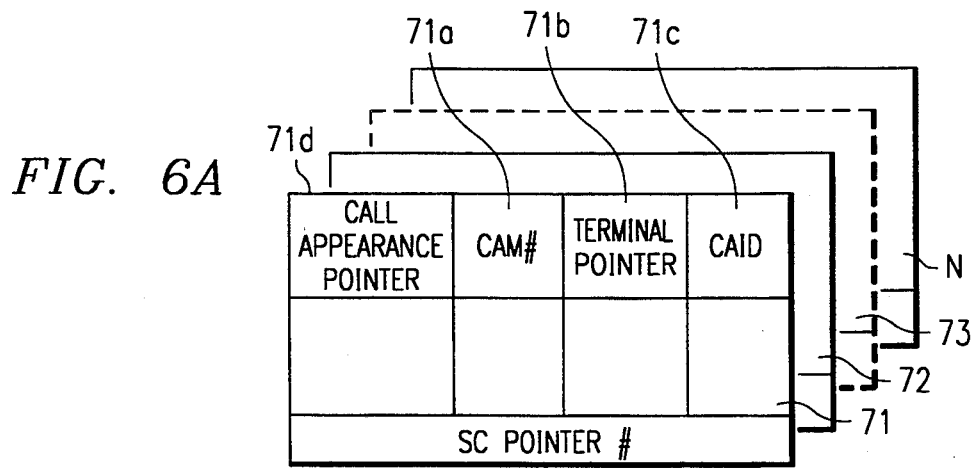
FIG. 6A is a diagram of a first subscriber file arrangement used in the present invention.

Referring next to FIG. 6A, there is shown a subscriber file arrangement within the present system for each subscriber pointer 71, 72, 73, . . . n, in which there is a file containing call appearance member numbers (CAM#) 71a in relation with a terminal pointer 71b and a call appearance ID number 71c and call appearance pointer 71d. This enables the system to locate for each subscriber pointer and call appearance member number, the assigned terminal and call appearance ID for certain applications.

In FIG. 6B, there is shown a subscriber file arrangement within the present system for each call appearance pointer 101, 102, 103, . . . n, in which there is a file containing subscriber pointers (SCp) and call appearance numbers (CA#) in relation to one another. This enables the system to locate for each call appearance, all its members (CAM#s).

When a SETUP message is received, the call appearance ID is a part of it. Thus, on an originating call, a terminal pointer designation plus a call appearance ID (CAID) provides all the necessary information about DN, CAp, and CAM# for the switch to provide individual treatment to the appearance. However, when terminating a call to an EKTS subscriber, the SETUP message is sent to all of the members of that DN that can receive the call, and it is not until after the first CAM has answered the call that the switching system can provide different treatment to those appearances in accordance with individual subscriber features. The choice of which call appearances to a DN should be presented with the call is made by means of the data stored in the files of FIGS. 6A and 6B. This means that the other parts of the system are not affected by the present technique of offering a call to an EKTS subscriber.

As mentioned above, there are a number of blocks of software within the telecommunication switching system with which the data structure of the present invention is transparent. These blocks will simply continue to handle the 32 bit field containing the subscriber call identifier data word and employ only the subscriber pointer portion thereof as has been conventionally done. Other blockst however, will use the call appearance member number data from the subscriber call identifier data word to provide an enhanced level of performance within the switching system itself. For example, some of the blocks which may use the call appearance member number data include the subscriber database blocks, certain of the charging blocks, as well as certain feature blocks. For example, subscriber database blocks may use the call appearance member number data to determine what features are assigned to that particular caller (such as whether or not that terminal includes flash property) as well as to define what kind of terminal it is (ISDN access or POTS access). Similarly, a charging block may use the call appearance member number data to identify which terminal of a particular directory number should be charged for the call. Similarly, the feature block (especially within ISDN) may identify whether or not the call appearance member number data identifier corresponds with a subscriber having ISDN conference facilities or ISDN transfer facilities.

Figure 7:
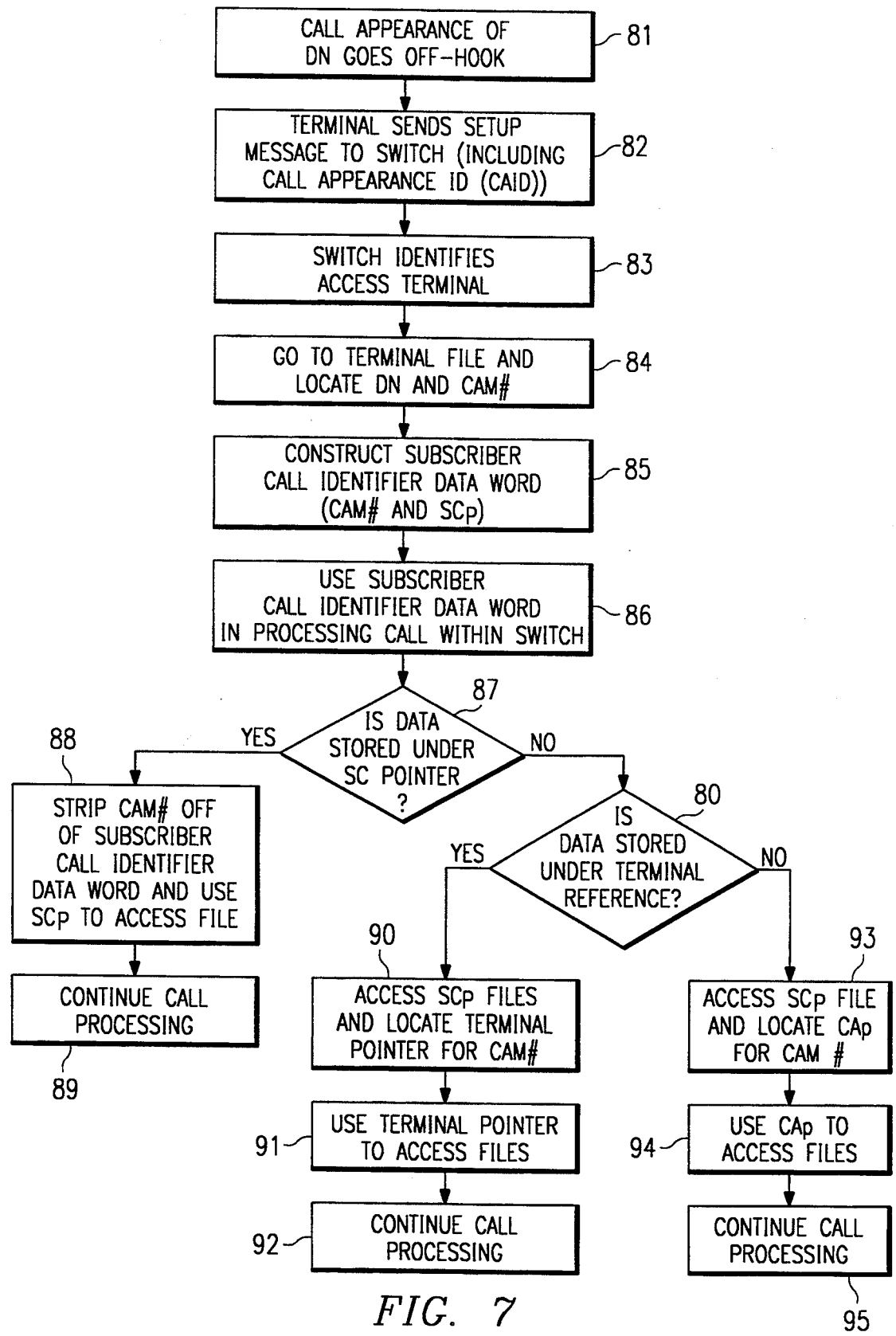
FIG. 7 is a flow chart of certain call processing procedures used in accordance with the present invention.

Referring next to the flow chart of FIG. 7, there is illustrated a procedure which is employed within the system of the present invention to implement an enhanced level of service in accordance with the present invention. In processing a call occurring from, for example, a single caller of an EKTS terminal, the system first evaluates at 81 a detection of when the call appearance of the directory number goes off-hook. Next, at 82, the terminal going off-hook sends a setup message to the switch, including a call appearance ID (CAID). Thereafter, at 83, the switch identifies the particular access terminal corresponding to the call appearance ID number and moves to 84 at which it goes to the terminal file corresponding to the access number identified to locate the directory number and the call appearance member number corresponding thereto. At 85, the system constructs a subscriber call identifier data word comprising the call appearance member number and the subscriber pointer within a single 32 bit field. At 86, the system uses the subscriber call identifier data word in processing the call within the switch. In the processing of the call, the software of the switch may determine whether or not particular access tables at 87 are stored under a directory number reference. If yes, the system moves to 88 at which it strips off the call appearance member number from the subscriber call identifier data word and uses the subscriber pointer alone to access the file and continues call processing at 89. If, however, at 87, the system determines that certain necessary data, such as feature data, is not stored under a directory number reference, the system moves to 80 where it determines whether of not the access tables are stored under a terminal identifier reference. If the necessary data is determined to be stored under the terminal reference, the system moves to 90 where it accesses the SCp files and locates the terminal pointer for the call appearance member number. Thereafter at 91, it uses the terminal pointer to access the particular file and continues processing the call at 92. If, however, at 80 the system determines that the data is not stored under the terminal reference, it moves to 93 where it access the subscriber pointer file SCp and locates the call appearance pointer CAp for the call appearance member number CAM#. Thereafter at 94 it uses the call appearance pointer CAp to access the particular file and continues processing the call at 95.

It should be noted that the call appearance member number employed in the system of the present invention is only used within the call processing software of the switching system and therein only for the processing of data. Its usage enables the identification of one of a plurality of particular subscribers associated with a single directory number identification and thus, enables the application of particular features and other functionality to that subscriber without requiring the modification of software blocks within the system other than those necessary to supply the required functionality.

A principle benefit of the present invention is the provision of a single variable data word with which all types of users can be uniquely identified. No software units within the switching system need to be modified in order to manipulate this data for traffic handling and it is transparent to all of the software blocks other than those which are specifically configured to recognize the additional data carrying portions of the word to enhance the functionality of the switch. The only software units which are effected by the call appearance member number portion of the subscriber call identifier data word employed in the present invention are the software units which read or write directly into the user information.

While it is believed that the operation and construction of the system of the present invention will be apparent from the foregoing description, the method of operation and the structure of the system shown and described has been characterized as being preferred and obvious changes and modifications may be made therein without departing from the spirit and scope of the invention as defined in the following claims.

What is cliamed is:

1. A method of identifying individual subscriber appearances having a common directory number within the software modules of a telecommunication switching system, comprising:
   implementing subscriber pointer data within the software modules utilizing a plurality of bit positions;
   defining a subscriber call identifier data word to include a first data field comprising a subscriber pointer corresponding to the directory number with which the subscriber is associated and a second data field comprising a call appearance member number corresponding to the individual subscriber appearance with which the call is associated;
   passing the subscriber call identifier data word through the software modules of the switching system; and
   recognizing the call appearance member number data field of said subscriber call identifier data word only within software modules which implement functionality associated with an individual subscriber appearance.

2. A method of identifying individual subscriber appearances having a common directory number within the software modules of a telecommunication switching system as set forth in claim 1 wherein said step of defining a subscriber call identifier data word includes the step of:
   defining a subscriber call identifier data word which contains the same number of bit positions as utilized to implement the subscriber pointer data within the software modules.

3. A method of identifying individual subscriber appearances having a common directory number within the software modules of a telecommunication switching system as set forth in claim 1 in which said switching system includes an access subsystem within which a plurality of distinct terminals are located and each of which may be associated with a separate directory number and in which a call access from a subscriber includes a message containing a distinct call appearance ID number, said method including the additional step of:
   defining a set of data files within said switching system in which a terminal pointer is associated with each of said terminals and for each terminal pointer there is established a relationship between call appearance ID numbers, corresponding directory numbers and corresponding call appearance member numbers.

4. A method of identifying individual subscriber appearances having a common directory number within the software modules of a telecommunication switching system as set forth in claim 3 in which said switching system includes an access subsystem within which a plurality of distinct terminals are located and each of which may be associated with a separate directory number and in which a call access from a subscriber includes a message containing a distinct call appearance ID number, said method including the additional step of:
   defining a set of data files within said switching system in which a subscriber pointer is associated with each of said directory numbers and for each subscriber pointer there is established a relationship between call appearance ID numbers, corresponding terminal pointers and corresponding call appearance member numbers.

5. In a stored program controlled telecommunications switching system used for integrated services digital network service in which said switching system includes a plurality of access terminals, and a plurality of individual subscriber appearances have a common directory number and within which the call processing software modules identify each directory number by a subscriber pointer contained within a fixed multibit data word, a method of operating said system comprising:

communicating software signals between call processing software modules of said switching system, said signals identifying individual subscriber appearances having the same directory number by means of a sub-address field contained within said fixed multibit data word along with said subscriber pointer but distinguished therefrom by its bit positions within said word; and modifying each of the software modules of said switching system which contain functionality associated with individual subscriber appearances to recognize data within said sub-address field within said fixed multibit data word and apply call processing functions accordingly.

6. In a stored program controlled telecommunications switching system used for integrated services digital network service in which a plurality of individual subscriber appearances have a common directory number and within which the call processing software modules identify each directory number by a subscriber pointer contained within a fixed multibit data word, a method of operating said system set forth in claim 5 in which said multibit data word comprises 32 bit positions and in which the subscriber pointer data occupies bit positions 0-19 and said sub-address field occupies bit positions 23-31.

7. In a stored program controlled telecommunications switching system used for integrated services digital network service in which a plurality of individual subscriber appearances have a common directory number and within which the call processing software modules identify each directory number by a subscriber pointer contained within a fixed multibit data word, a method of operating said system set forth in claim 5 which includes the additional step of:

providing a set of data files within said switching system in which for each terminal having access to said switching system, indicia identifying each subscriber appearance having access to said switching system through said terminal is correlated with its associated directory number and a unique identifier to be included within the sub-address data field of said fixed multibit data word.

8. In a stored program controlled telecommunications switching system used for integrated services digital network service in which a plurality of individual subscriber appearances have a common directory number and within which the call processing software modules identify each directory number by a subscriber pointer contained within a fixed multibit data word, a method of operating said system set forth in claim 7 which includes the additional step of:

providing a set of data files within said switching system in which for each subscriber pointer used within said switching system, indicia identifying each subscriber appearance having access to said switching system through said terminal is correlated with its associated directory number and said unique identifier to be included within the sub-address data field of said fixed multibit data word.

9. A system for identifying individual subscriber appearances having a common directory number within the software modules of a telecommunication switching system, comprising:

means for implementing subscriber pointer data within the software modules utilizing a plurality of bit positions;

means for defining a subscriber call identifier data word to include a first data field comprising a subscriber pointer corresponding to the directory number with which the subscriber is associated and a second data field comprising a call appearance member number corresponding to the individual subscriber appearance with which the call is associated;

means for passing the subscriber call identifier data word through the software modules of the switching system; and means for only recognizing the call appearance member number data field of said subscriber call identifier data word within software modules which implement functionality associated with an individual subscriber appearance.

10. A system for identifying individual subscriber appearances having a common directory number within the software modules of a telecommunication switching system as set forth in claim 9 wherein said subscriber call identifier data word defined contains the same number of bit positions as utilized to implement the subscriber pointer data within the software modules.

11. A system for identifying individual subscriber appearances having a common directory number within the software modules of a telecommunication switching system as set forth in claims 9 in which said switching system includes an access subsystem within which a plurality of distinct terminals are located and each associated with a separate directory number and in which a call access from a subscriber includes a message containing a distinct call appearance ID number, said system also including:

means for defining a set of data files within said switching system in which a terminal pointer is associated with each of said terminals and for each terminal pointer there is established a relationship between call appearance ID numbers, corresponding directory numbers and corresponding call appearance member numbers.

12. A system for identifying individual subscriber appearances having a common directory number within the software modules of a telecommunication switching system as set forth in claim 11 in which said switching system includes an access subsystem within which a plurality of distinct terminals are located and each associated with a separate directory number and in which a call access from a subscriber includes a message containing a distinct call appearance ID number, said system also including:

means for defining a set of data files within said switching system in which a subscriber pointer is associated with each of said directory numbers and for each subscriber pointer there is established a relationship between call appearance ID numbers, corresponding terminal pointers and corresponding call appearance member numbers.

13. In a stored program controlled telecommunications switching system used for integrated services digital network service in which said switching system includes a plurality of access terminals, and a plurality of individual subscriber appearances have a common directory number and within which the call processing software modules identify each directory number by a subscriber pointer contained within a fixed multibit data word:

means for communicating software signals between call processing software modules of said switching system, said signals identifying individual subscriber appearances having the same directory number by means of a sub-address field contained within said fixed multibit data word along with said subscriber pointer but distinguished therefrom by its bit positions within said word; and software modules within said switching system which contain functionality associated with individual subscriber appearances to recognize data within said sub-address field within said fixed multibit data word and apply call processing functions accordingly.

14. In a stored program controlled telecommunications switching system used for integrated services digital network service in which a plurality of individual subscriber appearances have a common directory number and within which the call processing software modules identify each directory number by a subscriber pointer contained within a fixed multibit data word, as set forth in claims 13 in which said multibit data word comprises 32 bit positions and in which the subscriber pointer data occupies bit positions 0–19 and said sub-address field occupies bit positions 23–31.

15. In a stored program controlled telecommunications switching system used for integrated services digital network service in which a plurality of individual subscriber appearances have a common directory number and within which the call processing software modules identify each directory number by a subscriber pointer contained within a fixed multibit data word, as set forth in claim 13 which also includes:

means for providing a set of data files within said switching system in which for each terminal having access to said switching system indicia identifying each subscriber appearance having access to said switching system through said terminal is correlated with its associated directory number and a unique identifier to be included within the sub-address data field of said fixed multibit data word.

16. In a stored program controlled telecommunications switching system used for integrated services digital network service in which a plurality of individual subscriber appearances have a common directory number and within which the call processing software modules identify each directory number by subscriber pointer contained within a fixed multibit data word, as set forth in claim 15 which also includes:

means for providing a set of data within said switching system in which for each subscriber pointer used within said switching indicia identifying each subscriber appearance having access to said switching system through said terminal is correlated with its associated directory number and said unique identifier to be included within the sub-address data field of said fixed multi bit data word.

17. A method of processing calls within a stored program controlled telecommunications switching system used for integrated services digital network service in which a plurality of individual subscriber appearances connected to said switching system by means of access terminals have a common directory number and within which the call processing software modules including a subscriber data base identify each directory number by a subscriber pointer contained within a fixed multibit data word, said method comprising:

recognizing within said switching system a request for access in response to an off-hook signal received at a terminal associated with a particular directory number;

receiving a setup message from the terminal requesting access, said message including a call appearance ID;

identifying within said switching system the particular access terminal upon which said off-hook signal was received;

locating within a terminal file data base information corresponding to said particular access terminal and, in response to the call appearance ID received within said setup message, identifying a corresponding directory number and call appearance member number associated with the particular subscriber appearance originating said access request from said access terminal;

assembling a subscriber call identifier data word within the bit format of said fixed multibit data word comprising said call appearance member number and said subscriber pointer; and using the subscriber call identifier data word in processing the call from said access terminal within the software modules within said switching system.

18. A method as set forth in claim 17, wherein said step of using the subscriber call identifier data word for processing the call within the switching system includes:

determining whether or not particular data needed to process said call is stored within said terminal file data base in association with said terminal from which said call originated; and stripping off said call appearance member number from the subscriber call identifier data word and using the subscriber pointer to access a data file needed for call processing in response to a determination that said particular data is not maintained within said terminal file data base in association with said terminal.

19. A method as set forth in claim 18, wherein said step of using the subscriber call identifier data word for processing the call within the switching system also includes:

responding to a determination that said particular data is maintained within said terminal file data base in association with said terminal by locating within a subscriber pointer file data base a terminal pointer corresponding to the call appearance member number of the particular subscriber appearance originating said access request from said access terminal;

using the terminal pointer to access the data file needed for call processing and continue processing the call within the software of said switching system.

20. A method as set forth in claim 18, wherein said step of using the subscriber call identifier data word for processing the call within the switching system also includes:

responding to a determination that said particular data is not maintained within said terminal file data base by locating within a subscriber pointer file data base a call appearance pointer corresponding to the call appearance member number of the particular subscriber appearance originating said access request from said access terminal;

using the call appearance pointer to access the data file needed for call processing and continue processing the call within the software of said switching system.

21. A method as set forth in claim 17, wherein said step of using the subscriber call identifier data word in processing the call within the switching system also includes:

communicating software signals between call processing software modules of said switching system, said signals identifying individual subscriber appearances having the same directory number by means of a call appearance member number sub-address field contained within said fixed multibit data word comprising said subscriber call identifier data word along with said subscriber pointer but distinguished therefrom by its bit positions within said word; and modifying each of the software modules of said switching system which contain functionality associated with individual subscriber appearances to recognize data within said sub-address field within said fixed multibit data word and apply call processing functions accordingly.

22. A method as set forth in claim 21, wherein said fixed multibit data word comprises 32 bit positions and in which the subscriber pointer data occupies bit positions 0-19 and said sub-address field occupies bit positions 23-31.

23. A system for processing calls within a stored program controlled telecommunications switching system used for integrated services digital network service in which a piurality of individual subscriber appearances connected to said switching system by means of access terminals have a common directory number and within which the call processing software modules including a subscriber data base identify each directory number by a subscriber pointer contained within a fixed multibit data word, said call processing system comprising:

means for recognizing within said switching system a request for access in response to an off-hook signal received at a terminal associated with a particular directory number;

means for receiving a setup message from the terminal requesting access, said message including a call appearance iD;

means for identifying within said switching system the particular access terminal upon which said off-hook signal was received;

means for locating within a terminal file data base information corresponding to said particular access terminal and, responsive to the call appearance ID received within said setup message, means for identifying a corresponding directory number and call appearance member number associated with the particular subscriber appearance originating said access request from said access terminal;

means for assembling a subscriber call identifier data word within the bit format of said fixed multibit data word comprising said call appearance member number and said subscriber pointer; and means for using the subscriber call identifier data word in processing the call from said access terminal within the software modules within said switching system.

24. A system as set forth in claim 23, wherein said means for using the subscriber call identifier data word for processing the call within the switching system includes:

means for determining whether or not particular data needed to process said call is stored within said terminal file data base in association with said terminal from which said call originated; and means for stripping off said call appearance member number from the subscriber call identifier data word and using the subscriber pointer to access the needed data file in response to a determination that said particular data is not maintained within said terminal file data base in association with said terminal.

25. A system as set forth in claim 23, wherein said means for using the subscriber call identifier data word for processing the call within the switching system also includes:

means for determining whether or not particular data needed to process said call is stored within said terminal file data base in association with said terminal from which said call originated;

means for responding to a determination that said particular data is maintained within said terminal file data base in association with said terminal by locating within a subscriber pointer file data base a terminal pointer corresponding to the call appearance member number of the particular subscriber appearance originating said access request from said access terminal; and means for using the terminal pointer to access the data file needed for call processing and continue processing the call within the software of said switching system.

26. A system as set forth in claim 23, wherein said means for using the subscriber call identifier data word for processing the call within the switching system also includes:

means for determining whether or not particular data needed to process said call is stored within said terminal file data base in association with said terminal from which said call originated;

means for responding to a determination that said particular data is not maintained within said terminal file data base by locating within a subscriber pointer file data base a call appearance pointer corresponding to the call appearance member number of the particular subscriber appearance originating said access request from said access terminal; and means for using the call appearance pointer to access the data file needed for call processing and continue processing the call within the software of said switching system.

27. A system as set forth in claim 23, wherein said means for using the subscriber call identifier data word in processing the call within the switching system also includes:

means for communicating software signals between call processing software modules of said switching system said signals identifying individual subscriber appearances having the same directory number by means of a call appearance member number sub-address field contained within said fixed multibit data word comprising said subscriber call identifier data word along with said subscriber pointer but distinguished therefrom by its bit positions within said word; and means for modifying each of the software modules of said switching system which contain functionality associated with individual subscriber appearances to recognize data within said sub-address field within said fixed multibit data word and apply call processing functions accordingly.

28. A system as set forth in claim 27, wherein said fixed multibit data word comprises 32 bit positions and in which the subscriber pointer data occupies bit positions 0-19 and said sub-address field occupies bit positions 23-31.

* * * * *